US010419306B2

(12) United States Patent
Droux et al.

(10) Patent No.: US 10,419,306 B2
(45) Date of Patent: Sep. 17, 2019

(54) DETERMINING THE CAUSATION OF EVENTS ACROSS MULTIPLE NODES USING MESSAGE PROPERTIES

(71) Applicant: Oracle International Corporation, Redwood Shores, CA (US)

(72) Inventors: Nicolas G. Droux, Rio Rancho, NM (US); Mohan Iyer, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 431 days.

(21) Appl. No.: 14/983,014

(22) Filed: Dec. 29, 2015

(65) Prior Publication Data

US 2017/0187586 A1 Jun. 29, 2017

(51) Int. Cl.
*H04L 12/26* (2006.01)
(52) U.S. Cl.
CPC ............ *H04L 43/045* (2013.01); *H04L 43/06* (2013.01)
(58) Field of Classification Search
CPC .................................................... H04L 43/045
See application file for complete search history.

(56) References Cited

U.S. PATENT DOCUMENTS

| | | | |
|---|---|---|---|
| 5,896,524 A | 4/1999 | Halstead, Jr. et al. | |
| 6,807,583 B2 | 10/2004 | Hrischuk et al. | |
| 7,113,988 B2 | 9/2006 | Chirashnya et al. | |
| 7,254,646 B2 | 8/2007 | Aguilera et al. | |
| 7,570,669 B2 | 8/2009 | Malloy et al. | |
| 8,245,083 B2 | 8/2012 | Van Der Merwe et al. | |
| 2002/0194393 A1* | 12/2002 | Hrischuk ................ | G06F 9/542 719/318 |
| 2004/0111706 A1 | 6/2004 | Mogul et al. | |
| 2004/0123293 A1* | 6/2004 | Johnson ................. | G06F 9/466 718/101 |
| 2004/0268315 A1* | 12/2004 | Gouriou ................ | G06F 11/362 717/129 |
| 2005/0015424 A1 | 1/2005 | Aguilera et al. | |

(Continued)

OTHER PUBLICATIONS

Fonseca, R. et al., "X-Trace: A Pervasive Network Tracing Framework", 4th USENIX Symposium on Networked Systems Design & Implementation (NSDI'07), Apr. 2007 (14 pages).

*Primary Examiner* — Nicholas R Taylor
*Assistant Examiner* — Sanjoy K Roy
(74) *Attorney, Agent, or Firm* — Ferguson Braswell Fraser Kubasta PC

(57) ABSTRACT

A system and method for determining causation of events across nodes. The invention may include receiving a first event report of a first trace. The first event report may include a first trace identifier. The method may also include assembling a first sub-graph using the first event report; receiving a suspend event report including a message identifier and the first trace identifier; receiving a resume event report including the message identifier and a second trace identifier; and receiving a second event report of the second trace, where the second event report includes the second trace identifier. Additionally, the method may include assembling a second sub-graph using the second event report; and assembling, based on matching the message identifier of the suspend event report and the resume event report, a tracing graph using the first sub-graph and the second sub-graph.

18 Claims, 6 Drawing Sheets

(56) References Cited

U.S. PATENT DOCUMENTS

| | | | |
|---|---|---|---|
| 2005/0021708 A1* | 1/2005 | Raghuraman | G06Q 10/10 709/223 |
| 2005/0060403 A1 | 3/2005 | Bernstein et al. | |
| 2005/0288915 A1 | 12/2005 | Hines | |
| 2010/0223446 A1* | 9/2010 | Katariya | G06F 11/3495 712/220 |
| 2010/0306777 A1* | 12/2010 | Mohanty | G06F 9/546 718/102 |
| 2012/0260135 A1* | 10/2012 | Beck | G06F 11/323 714/45 |
| 2014/0215443 A1* | 7/2014 | Voccio | G06F 11/3612 717/128 |

* cited by examiner

DETERMINING THE CAUSATION OF EVENTS ACROSS MULTIPLE NODES USING MESSAGE PROPERTIES

BACKGROUND

In order to gain information related to the function, performance, etc. of one or more devices (e.g., computing devices, network devices, storage devices, etc.) or portions thereof, it is often helpful to associate events (e.g., execution of software instructions, passage of data between layers of a computing device, passing of data between nodes of an interconnected system, etc.) as related. For example, if a computer program fails in some way, it is often helpful to know the instruction executed at the time of failure, as well as instructions executed before and/or after that time of failure. As another example, in a scenario where one or more nodes (e.g., computing devices) are interconnected, understanding the relationship between events on different nodes may provide insight when analyzing the performance between nodes and/or debugging. Attempting to gain such information may occur via an attempt to use data to correlate events. For example, one way to correlate events is to examine the time at which the events occur and attempt to relate events based on the time at which they occurred. However, analysis based on time or other data may lead to false correlation rather than a causal relationship between events.

SUMMARY

In general, in one aspect, the invention relates to a method for determining causation of events across nodes. In one or more embodiments of the invention, the invention includes receiving, at a tracing server from a first node, a first event report of a first trace. The first event report may include a first trace identifier corresponding to the first trace. The method may also include assembling a first sub-graph using the first event report; receiving, at the tracing server, from the first node, a suspend event report including a message identifier and the first trace identifier; receiving, at the tracing server from a second node, a resume event report including the message identifier and a second trace identifier of a second trace; and receiving, at the tracing server from the second node, a second event report of the second trace, where the second event report includes the second trace identifier. Additionally, the method may include assembling a second sub-graph using the second event report; and assembling, based on matching the message identifier of the suspend event report and the resume event report, a tracing graph using the first sub-graph and the second sub-graph.

In general, in one aspect, the invention relates to a non-transitory computer readable medium including instructions that, when executed by a computer processor, perform a method for determining causation of events across nodes. The method may include receiving, at a tracing server from a first node, a first event report of a first trace. The first event report may include a first trace identifier. The method implemented via executing the instructions may further include assembling a first sub-graph using the first event report; receiving, at the tracing server, from the first node, a suspend event report including a message identifier and the first trace identifier; receiving, at the tracing server from a second node, a resume event report including the message identifier and a second trace identifier of a second trace; and receiving, at the tracing server from the second node, a second event report of the second trace, where the second event report includes the second trace identifier. Additionally, the method implemented via execution of the instructions may include assembling a second sub-graph using the second event report; and assembling, based on matching the message identifier of the suspend event report and the resume event report, a tracing graph using the first sub-graph and the second sub-graph.

In general, in one aspect, the invention relates to a system for determining causation of events across nodes. The system may include a first node configured to initiate a first trace; generate a first event report corresponding to a first event of the first trace, where the first event report includes a first trace identifier corresponding to the first trace; and transmit the first event report to a tracing server. The first node may also be configured to perform a determination that, as a second event of the first trace, a message is to be sent to a second node; generate, based on the determination, a second event report and a suspend event report including the first trace identifier and a message identifier corresponding to the message; transmit the second event report and the suspend event report to the tracing server; and transmit the message to the second node. The system may also include the second node operatively connected to the first node and configured to receive the message; initiate a second trace; generate, based on receiving the message, a resume event report including a second trace identifier and the message identifier; and transmit the resume event report to the tracing server. The second node may also be configured to generate a third event report corresponding to a third event of the second trace, where the third event report includes the second trace identifier; and transmit the third event report to the tracing server. The system may additionally include the tracing server operatively connected to both the first node and the second node and configured to assemble, using the first event report and the second event report, a first sub-graph; assemble, using the third event report, a second sub-graph; and assemble, based on matching the message identifier of the suspend event report and the resume event report, a tracing graph using the first sub-graph and the second sub-graph.

Other aspects of the invention will be apparent from the following description and the appended claims.

DETAILED DESCRIPTION

Figure 1:
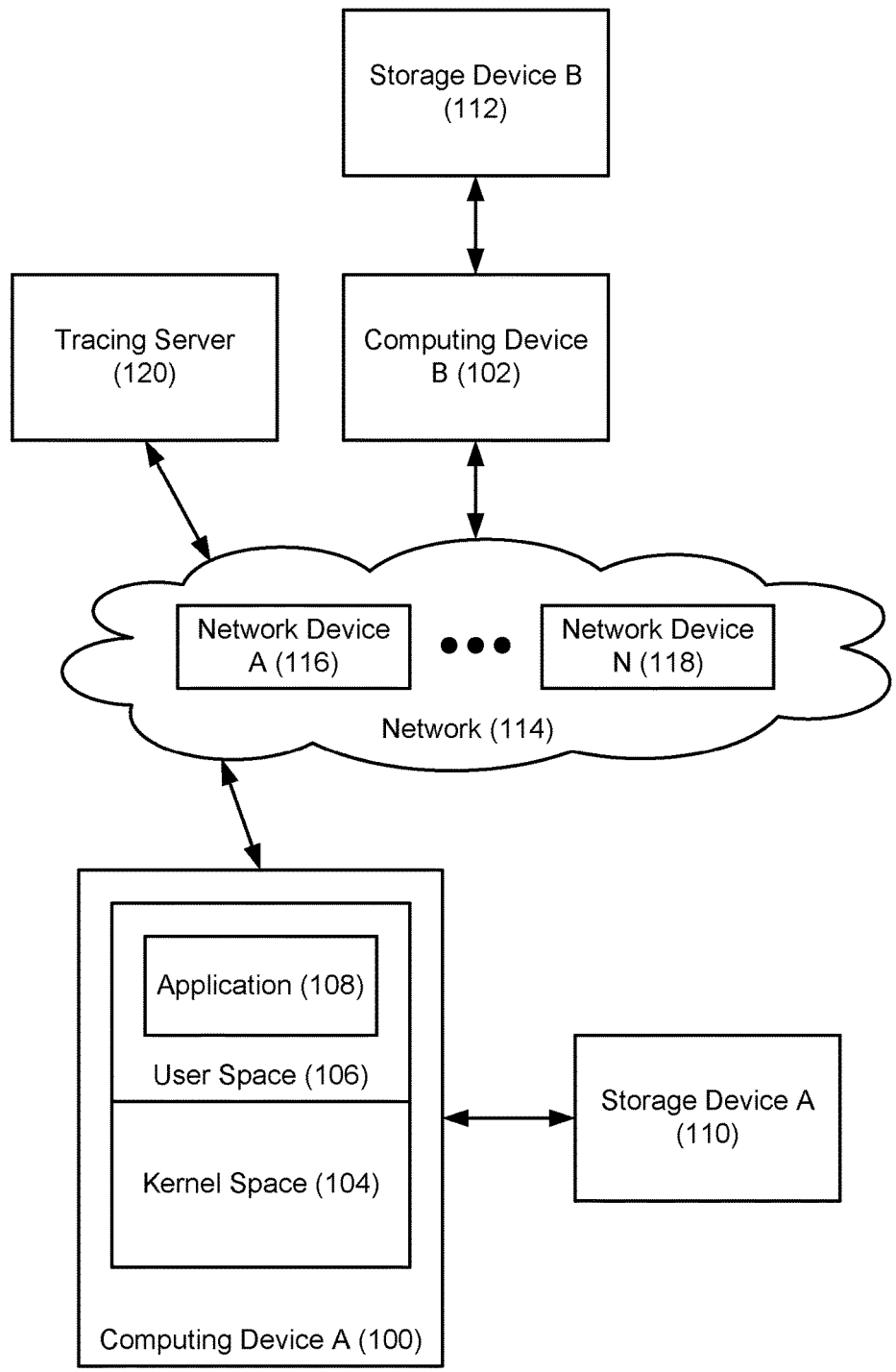
FIG. 1 shows a system in accordance with one or more embodiments of the invention.

Specific embodiments of the invention will now be described in detail with reference to the accompanying figures. Like elements in the various figures may be denoted by like names and/or like reference numerals for consistency.

In the following Detailed Description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method, system, and computer-readable medium for determining the causal relationship of events across multiple nodes using message properties. Specifically, in one or more embodiments of the invention, events occurring on a first node are traced until an event occurs in which information is to be transmitted to another node, at which point a suspend event is generated on the first node. In such embodiments of the invention, once the transmitted information is received by a second node, a resume event is generated on the second node and events occurring on the second node are traced. In one or more embodiments of the invention, a sub-graph is created by a tracing server corresponding to the events that occur on the first node, and another sub-graph is created by the tracing server corresponding to the events that occur on the second node. The two subgraphs may be joined to one another by the tracing server using the suspend event from the first node and the resume event on the second node. More specifically, the two sub-graphs may be joined based on a message identifier that is common to both the suspend event and the resume event and based, at least in part, on at least a portion of the information passed from the first node to the second node.

FIG. 1 shows a system in accordance with one or more embodiments of the invention. As shown in FIG. 1, the system includes computing devices (e.g., computing device A (100), computing device B (102)). A computing device may include kernel space (104), user space (106), any number of executing applications (e.g., application (108)) and/or executing processes (not shown), threads (not shown), etc. A computing device may be operatively connected to a storage device (e.g., storage device A (110), storage device B (112)). Two or more of the components of the system may be operatively connected via a network (114). A network may include any number of network devices (e.g., network device A (116), network device N (118)). The system may also include a tracing server (120). Each of these components is described below.

In one or more embodiments of the invention, a computing device (100, 102) is any device and/or any set of devices (e.g., a distributed computing system) capable of electronically processing instructions, serially or in parallel, and that includes at least the minimum processing power, memory, input and output (IO) device(s), operatively connected storage device(s), and/or network connectivity in order to contribute to the performance of at least some portion of the functionality described in accordance with one or more embodiments of the invention. Examples of computing devices (100, 102) include, but are not limited to, one or more server machines (e.g., a blade server in a blade server chassis), virtual machines (VMs), desktop computers, mobile devices (e.g., laptop computer, smartphone, personal digital assistant, tablet computer, and/or any other mobile computing device), any other type of computing device with the aforementioned minimum requirements, and/or any combination of the listed examples.

In one or more embodiments of the invention, a computing device (100, 102) includes, but is not limited to, hardware, software, firmware, circuitry, integrated circuits, circuit elements implemented using a semiconducting material, registers, memory, and/or any combination thereof, all or a portion of which may include functionality to facilitate execution of instructions (e.g., instructions representing a software program written in any programming language for performing at least a portion of one or more embodiments of the invention). In one or more embodiments of the invention, although not shown in FIG. 1, one or more agents may execute on a computing device (100, 102) to monitor events, generate event reports, transmit event reports to a tracing server, etc. For example, an agent may be a software application executing on one or more processors of a computing device.

In one or more embodiments of the invention, a computing device (100, 102) includes one or more levels (e.g., rings) of protection, one of which (e.g., the lowest such as "ring 0") has the highest relative level of access to various components of a computing device, with one or more additional levels (e.g., rings 1, 2, 3, etc.) having increasingly restricted access to computing device resources. In one or more embodiments of the invention, one or more such levels may be referred to as kernel space (104). As used herein, kernel space (104) may refer to an operating environment portion of a computing device (e.g., memory locations, I/O devices, processors, etc.) in which only privileged execution occurs. For example, kernel space (104) may refer to computing device resources accessible to and/or for use by one or more of a kernel portion of an operating system, a hypervisor, some types or portions of device drivers, etc. In one or more embodiments of the invention, certain applications and other user facing processes may be restricted such that they are not allowed to directly access some or all of the kernel space (104). In one or more embodiments of the invention, a kernel is a computer program (e.g., a portion of an operating system) that includes functionality to manage, at least in part, access to hardware resources of a computing device by non-kernel resources (e.g., user applications).

In one or more embodiments of the invention, one or more levels of less privileged execution may be referred to as user space (106). As used herein, user space (106) may refer to portions of computing device (100, 102) resources other than those reserved for kernel space (104). For example, user space (106) may include a portion of the memory of the computing device other than that reserved for kernel space (104). User space (106) may include memory space for execution of software applications used by a user and/or by other software or processes executing on a computing device.

In one or more embodiments of the invention, though not shown in FIG. 1, portions of kernel space, user space, and/or any combination thereof, may be referred to as layers in which certain types of actions and/or operations are performed. For example, applications (108) executing in user space (106) and using portions of kernel space (104) for accessing I/O devices and processors may collectively be referred to as a network stack (not shown), which may include some number of layers in each of which some portion of the processing required to transmit information over a network occurs. In such an example, layers may include, but are not limited to, a layer for processing the request from the application, a layer for processing the request via a transmission control protocol (TCP), a layer for packaging the request as an internet protocol (IP) packet, a layer for packaging the IP packet into a media access control (MAC) frame, and a layer for transmitting the MAC frame to a network from a network adapter of a computing device via a wired or wireless connection.

In one or more embodiments of the invention, entities executing in kernel space (104) (e.g., an operating system kernel) may include functionality to access computing device resources in both kernel space (104) and user space (106), while entities executing in user space (e.g., a word processing program) may only have access to user space unless a kernel space entity is called (e.g., via a system call) to access kernel space resources. As an example, in order for an application to request content via a network, the application may make system calls to engage kernel space entities to properly package the request and ultimately transmit the request from a network adapter of the computing device, and to receive a response.

In one or more embodiments of the invention, one or more computing devices (100, 102) may be operatively connected to one or more storage devices (110, 112). A storage device (110, 112) may include any type of data repository. In one or more embodiments of the invention, the data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, one or more storage devices (110, 112) are directly attached to one or more computing devices. For example, an array of hard disks may be internal to a computing device or may be directly connected to a computing device via a wired or wireless connection. Additionally or alternately, while FIG. 1 shows storage devices directly connected to a computing device, in one or more embodiments of the invention, a storage device (110, 112) may be attached to a computing device indirectly, such as, for example, via a storage switch or a network. Examples of types of indirectly attached storage devices include, but are not limited to, network attached storage (e.g., network file system (NFS), Internet small computer system interface (iSCSI), etc.), fibre attached storage (e.g., fibre channel storage), or any other type of storage device (110, 112) accessible by and operatively connected to a computing device (100, 102).

In one or more embodiments of the invention, any or all of the components of the system of FIG. 1 may be connected via a network (114). In one or more embodiments of the invention, a network (114) is a collection of one or more network devices (116, 118) that facilitate network connectivity for one or more operatively connected devices (e.g., computing devices). In one or more embodiments of the invention, the network (114) may be all or a portion of a computer network. A computer network may include a datacenter network, a wide area network, a local area network, a wireless network, a cellular phone network, and/or any other suitable network that facilitates the exchange of information from one part of the network to another. The network (114) may be coupled with or overlap, at least in part, with the Internet.

In one or more embodiments of the invention, a network device (116, 118) is any device operatively connected to a network (114) and that includes functionality to perform at least some operations necessary to propagate information between computing devices, storage devices, etc. that are operatively connected to the network. A network device (116, 118) may include hardware, software, firmware, one or more processors, memory, storage, and two or more physical interfaces. Each interface may or may not be operatively connected to a device (e.g., computing device, storage device, another network device, etc.). In one or more embodiments of the invention, a network device includes functionality to receive information and process the information (e.g., using MAC address, IP address, etc.) in order to determine what action should be taken regarding the received information (e.g., transmitted from another interface towards a destination, dropped, responded to, etc.) Examples of network devices include, but are not limited to, switches, routers, and multi-layer switches (e.g., devices with both switching and routing capabilities).

In one or more embodiments of the invention, the system includes a tracing server (120). In one or more embodiments of the invention, a tracing server (120) includes hardware, software, firmware, circuitry, integrated circuits, and/or any combination thereof. For example, a tracing server may be a computer program executing on a computing device. In one or more embodiments of the invention, the tracing server (120) is implemented on a single computing device. In other embodiments of the invention, the tracing server (120) is implemented using two or more computing devices. In one or more embodiments of the invention, a tracing server (120) includes functionality to receive and/or respond to request from clients. The tracing server (120) may also include functionality to receive event information from one or more operatively connected computing devices (e.g., via agents executing on the computing device), storage devices, network devices, etc.

Additionally, the tracing server (120) may include functionality to create sub-graphs of causal relationships between events, to create trace graphs from two or more sub-graphs for tracing causal relationships across nodes, and/or to present information based on trace graph. A trace graph may be a series of two or more causally related events. Information based on trace graphs may be presented in response to queries received via a query application programming interface (API) (not shown). A query API may be an interface for querying the tracing server and may be accessible to a user, software, process, and/or any other interested entity. An interested entity may be referred to as a trace consumer. Functionality performed by the tracing server (120) is discussed further in the description of FIG. 2, below.

Though not shown in FIG. 1, any of the above-described system components, any portion thereof, or any combination of components and/or portions thereof may be referred to as a node (not shown). In one or more embodiments of the invention, a node is any device, or portion thereof, that performs any actions, performs any operations, executes any instructions, etc. related to and/or using any type of information. In one or more embodiments of the invention, a node may be referred to as a tracing client.

Examples of a node include, but are not limited to, any one or more computing devices, any one or more network devices, and any one or more storage devices. Additional examples of a node include, but are not limited to, any one or more layers of execution for transmitting data (e.g., one or more layers of the network stack of one or more computing devices), user space or any portion thereof, kernel space or any portion thereof, any process or thread executing on a computing device, any application, and/or any portion of a distributed application.

A node may include or be operatively connected to any number of executing agents for monitoring and/or tracing events that occur on a node, as well as for transmitting one or more event reports to a tracing server (120). In one or more embodiments of the invention, any node, or any portion thereof, may be monitored by an agent and may include additional components for initiating and/or performing a trace. For example, user applications, device drivers, etc. may be instrumented (i.e., code is inserted). Additionally, one or more tracing components (e.g., Dtrace, C language application programming interfaces (APIs), etc.) may be included in or operatively connected to a node, one or more buffers for storing event reports may be included in or operatively connected to a node, and/or one or more probes (e.g., implemented in instrumented code) may be configured to trigger (i.e., begin tracing an event) when certain actions occur. For example, a probe may be included in code for sending TCP messages, and when triggered may execute tracing functions written to perform certain actions (e.g., generate a suspend event, described below in the discussion of FIG. 2).

In one or more embodiments of the invention, when an event occurs on a node, an event report (not shown) is created. In one or more embodiments of the invention, an event report may include details related to an event. For example, such details may include, but are not limited to, a trace identifier, an event identifier, information related to one or more ancestor event identifiers, and a timestamp. In one or more embodiments of the invention, an ancestor event is an event that occurred before an event, is causally related, either indirectly or directly, to the event, and occurred on the same node as the event. In one or more embodiments of the invention, an identifier is any information that may be used to distinctly identify a given piece of information in a given context. For example, within a given node, each causally related event may be sequentially numbered with event identifiers. As another example, an ancestor event identifier may be the event identifier of an ancestor event. Event reports and tracing events between nodes is discussed further in the description of FIG. 2, below.

In one or more embodiments of the invention, a node includes functionality to transmit messages to and receive messages from any number of other nodes. In one or more embodiments of the invention, a message (not shown) is any information arranged according to any protocol for transmission between nodes. Types of messages include, but are not limited to, a HTTP request/response, a TCP packet, an IP packet, a MAC frame, an NFS request/response, a request to read data from or write data to a storage device, and/or any other type of data transmission between nodes. In one or more embodiments of the invention, the message may include a message identifier. Additionally or alternatively, a message may include information (e.g., one or more message characteristics) that may be used to generate a message identifier. In one or more embodiments of the invention, a message identifier uniquely identifies a message. Unique identification may be globally unique, or may be unique within a given environment, set of devices, network, etc. Messages and message identifiers are discussed further in the description of FIG. 2, below.

While FIG. 1 shows a configuration of components, other configurations may be used without departing from the scope of the invention. For example, various components may be combined to create a single component. As another example, the functionality performed by a single component may be performed by two or more components. Additionally, there may be any number of computing devices, storage devices, network devices, tracing servers, and/or other devices, each of which is operatively connected all other devices, or any portion thereof, via any type of connection (e.g., directly attached, network connected, etc.). Accordingly, for at least the above-recited reasons, embodiments of the invention should not be considered limited to the specific arrangements of devices and elements shown in FIG. 1.

Figure 2:
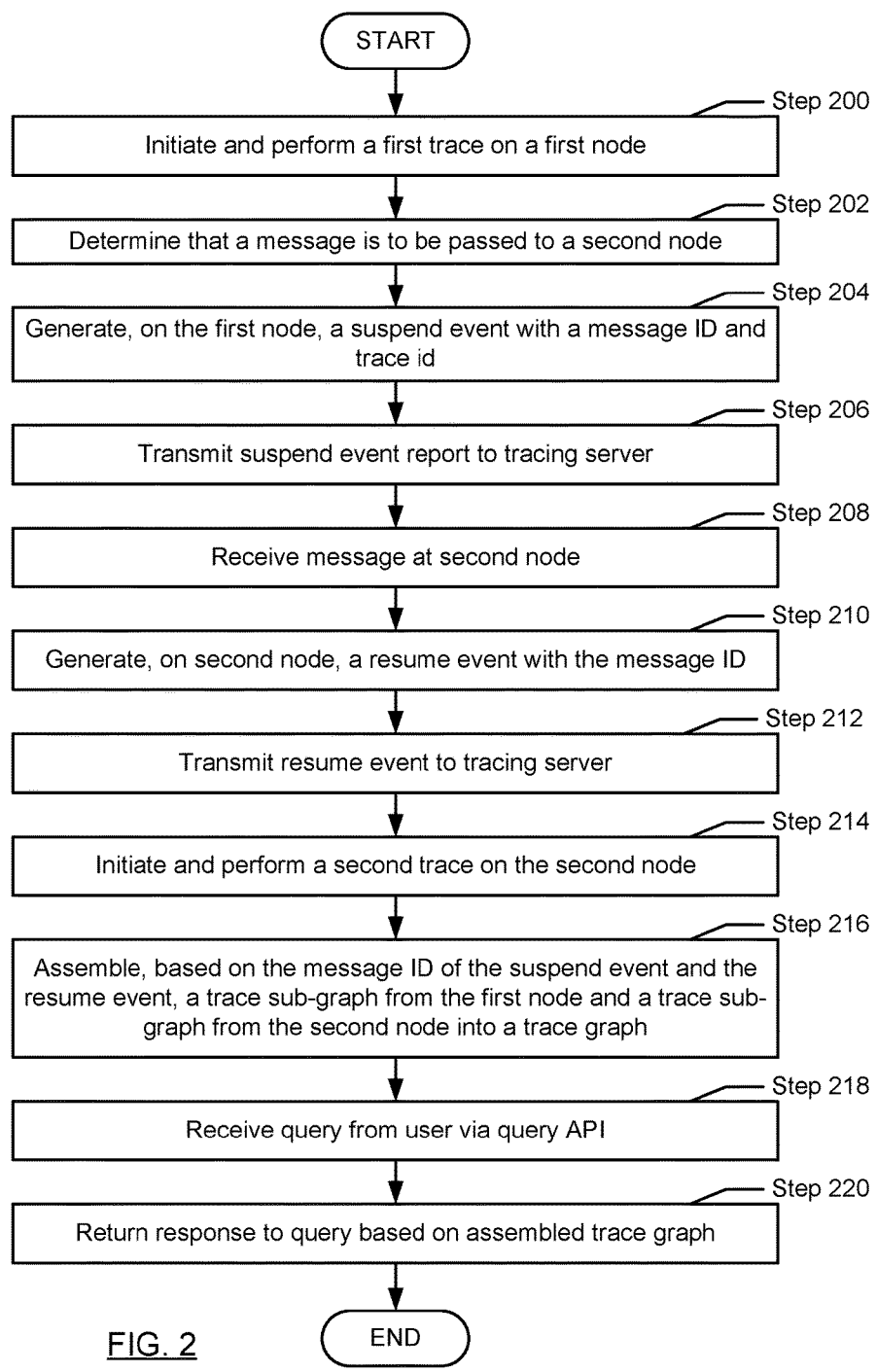
FIG. 2 shows a flowchart in accordance with one or more embodiments of the invention.

FIG. 2 shows a flowchart in accordance with one or more embodiments of the invention. While the various steps in this flowchart are presented and described sequentially, one having ordinary skill in the art and the benefit of this Detailed Description will appreciate that some or all of the steps may be executed in different orders, that some or all of the steps may be may be combined or omitted, that additional steps may occur that are not shown, and that some or all of the steps may be executed in parallel. Furthermore, the steps may be performed actively or passively. For example, some steps may be performed using polling or be interrupt driven in accordance with one or more embodiments of the invention.

FIG. 2 shows a flowchart describing a method for tracing causal relationships of events between nodes using message properties.

In Step 200, a trace is initiated and performed on a first node. In one or more embodiments of the invention, a trace may be initiated by any action corresponding to any node for which events are to be traced. A trace may be initiated by the occurrence of a specific event or type of event (e.g., a web client begins the process of sending a hypertext transport protocol (HTTP) request to an HTTP server). Alternately or additionally, a trace may be initiated by a user, by a process/thread, by an application, by a threshold being reached, by a time occurrence, etc. In one or more embodiments of the invention, a trace is initiated when a probe is triggered.

In one or more embodiments of the invention, the trace is performed, at least in part, using a tracing framework included in, executing in, or operatively connected to one or more nodes. In one or more embodiments of the invention, a tracing framework is any software, hardware, firmware, circuitry, or any combination thereof that includes functionality to monitor events of a node and store and/or maintain any type of information related to the events. A tracing framework may work for/with any number of agents of a node. For example, the tracing framework may include a probe that triggers when an event occurs, may store the current state of a trace (i.e., a tracing context (e.g., trace identifier, event id, ancestor id, etc.)), and may provide information related to one or more events to an agent for generating an event report. Such a probe, for example, may be included in instrumented code implementing any portion of a node. In one or more embodiments of the invention, the tracing framework may include functionality to generate event reports, which may be stored in a location (e.g., in an event reports buffer) that is accessible by an agent. In one or more embodiments of the invention, the agent includes functionality to obtain and/or generate one or more event reports and to transmit the one or more event reports to a tracing server.

In Step 202, while the trace initiated in Step 200 is being performed on the first node, a determination is made (e.g., via a tracing framework, an agent, triggering of a trace probe, etc.) that a message is to be passed to a second node. A determination that a first node is being passed to a second node may be made via any method of monitoring for message passing by a node. In one or more embodiments of the invention, the determination is made when a probe triggers, indicating that a first node is transferring a message intended for a second node. Messages may be transferred between any set of nodes. In other embodiments of the invention, an agent monitoring a certain aspect of a node may include functionality to monitor for messages being generated to be sent to a second node. As an example, in order to read data from an NFS storage device, a user application may engage an NFS client executing on a computing device to form the request, which may be considered a message. As another example, a tracing framework may be configured to trace messages from any one or more layers of the network stack. In such an example, a HTTP request with a payload from an application, an IP packet (which includes the HTTP request), a MAC frame (which includes the HTTP request and the IP packet), or data at any other layer(s) of the network stack may be a message. As another example, a thread executing on one processor (i.e., a first node) of a computing device may need to communicate with another thread executing on another processor (i.e., a second node), and the inter-thread communication may be considered a message.

In Step 204, in response to the determination made in Step 202, a suspend event is generated on the first node. The suspend event may be generated by an agent executing on the first node, by a tracing framework implemented on the first node, and/or by any other process or software executing on the first node. In one or more embodiments of the invention, generating a suspend event includes obtaining a message identifier, along with any other relevant information (e.g., a trace identifier, an event identifier, an ancestor event identifier, a timestamp, etc.) corresponding to the suspend event and/or the message to be passed to the second node. A suspend event may have its own event identifier, with the message event as the ancestor event of the suspend event (e.g., the suspend event includes the event ID of the message event as an ancestor event identifier).

In one or more embodiments of the invention, the message identifier is a portion of the information in the message. For example, an NFS request may have a transaction identifier (XID) that uniquely identifies the request, and therefore may be used as a message identifier. In other embodiments of the invention, the message identifier may be obtained using any information included in the message. Examples of message identifiers obtained using information of a message include, but are not limited to, creating/using a checksum, creating a hash based on all or part of the message, and using a combination of two or more portions of the message (e.g., sequence identifier and source IP address). In one or more embodiments of the invention, generation of a suspend event includes creation of a suspend event report that includes at least the information obtained as part of the suspend event, including the message identifier.

In Step 206, the suspend event report generated in Step 204 is transmitted to a tracing server. In one or more embodiments of the invention, the suspend event report may be transmitted to the tracing server by any method of exchanging data between devices. For example, if the tracing server is operatively connected, via a network, to a node and/or computing device on which an agent and/or tracing framework execute, then the suspend event report may be transmitted to the tracing server via the network. As another example, if the tracing server is directly attached to a node (e.g., to a computing device on which a node exists) or to an agent and/or tracing framework, then the suspend event report may be transmitted via the direct connection. In one or more embodiments of the invention, a suspend event report may be transmitted to a tracing server alone (i.e., without other event reports). In other embodiments of the invention, event reports may be put into one or more batches and sent to the tracing server. In such embodiments, the suspend event may be included in a batch of event reports.

In Step 208, the message is received from the first node at the second node. In one or more embodiments of the invention, the message may be received from the first node via any method of communicating information between nodes. Examples of messages received at a second node include, but are not limited to, information passed between from one layer to another, information passed from one thread to another, information transmitted from one computing device to another, information transmitted from a computing device to a storage device (or vice versa), and information transmitted from one network device to another or to a computing device.

In Step 210, in response to the receipt of the message made in Step 208, a resume event is generated on the second node. The resume event may be generated by an agent executing on the second node, by a tracing framework implemented on the second node, and/or by any other process or software executing on the second node. In one or more embodiments of the invention, generating a resume event includes obtaining a message identifier, along with any other relevant information (e.g., a trace identifier, an event identifier, an ancestor event identifier, a timestamp, etc.) corresponding to the resume event and/or the message received by the second node. A resume event may have its own event identifier and may not have an ancestor event. In one or more embodiments of the invention, the entity creating the resume event (e.g., agent, tracing framework, etc.) is configured to obtain the message identifier in the same manner as the message identifier was obtained for the suspend event. Therefore, in such embodiments of the invention, the message identifier of the resume event is the same as the message identifier of the suspend event from the first node. In one or more embodiments of the invention, generation of a resume event includes creation of a resume event report that includes at least the information obtained as part of the resume event, including the message identifier.

In Step 212, the resume event report is transmitted to the tracing server. In one or more embodiments of the invention, the resume event report may be transmitted to the tracing server by any method of exchanging data between devices. For example, if the tracing server is operatively connected to a node and/or computing device on which an agent and/or tracing framework execute via a direct connection, then the resume event report may be transmitted to the tracing server via the direct connection. In one or more embodiments of the invention, a resume event report may be transmitted to a tracing server alone. Alternatively, the resume event may be included in a batch of event reports sent from and including events occurring on the second node.

In Step 214, a trace is initiated and performed on the second node. In one or more embodiments of the invention, the trace is initiated based on the receipt of the message in Step 208. The trace that occurs on the second node may occur substantially similarly to how the trace on the first node occurred. For example, if a trace is tracing the Ethernet layer and IP layer of a network stack, receipt of a MAC frame may be a first event, and the ancestor event of such an event may be the resume event generated in Step 210, with subsequent events occurring when the message is passed from the Ethernet layer to the IP layer (e.g., after removal of Ethernet header information), and when the message is passed from the IP layer to another layer (e.g., after removal of the IP header information).

In Step 216, a trace graph is assembled. In one or more embodiments of the invention, the tracing server includes functionality to assemble trace sub-graphs using event reports from a given node, and to assemble two or more sub-graphs into a trace graph. In one or more embodiments of the invention, the event reports from the first node received at the tracing server, including the suspend event report, are used to generate a first sub-graph corresponding to the trace performed on the first node, and the event reports from the second node received at the tracing server, including the resume event report, are used to generate a second sub-graph corresponding to the trace performed on the second node. In one or more embodiments of the invention, the trace graph is assembled from the first sub-graph and the second sub-graph. The tracing server may assemble the sub-graphs by comparing the message identifier of the suspend event in the first sub-graph with the message identifier of the resume event of the second sub-graph, and determining that the message identifiers match. In one or more embodiments of the invention, matching the message identifiers indicates a causal relationship between the events of the first sub-graph and the events of the second sub-graph.

In Step 218, a query is received by the tracing server via a query API. In one or more embodiments of the invention, as discussed above in the description of FIG. 1, a query API is an interface through which interested entities may query the tracing server about a trace graph. Examples of queries include, but are not limited to, request for information related to latency between events, request for the quantity of steps taken to complete an operation, request to determine whether retransmissions are occurring, request for the order of the trace graph, request for the length of the path in the trace graph between any two events, and/or a request for the maximum degree of the trace graph.

In Step 220, based on the trace graph, a response is returned to the query received via the query API. In one or more embodiments of the invention, the response may be returned to the interested entity via any means of communicating information. For example, the results may be displayed in a graphical user interface (GUI), may be sent as text data, may be sent as a report detailing the answers to one or more queries, etc.

Figure 3A:
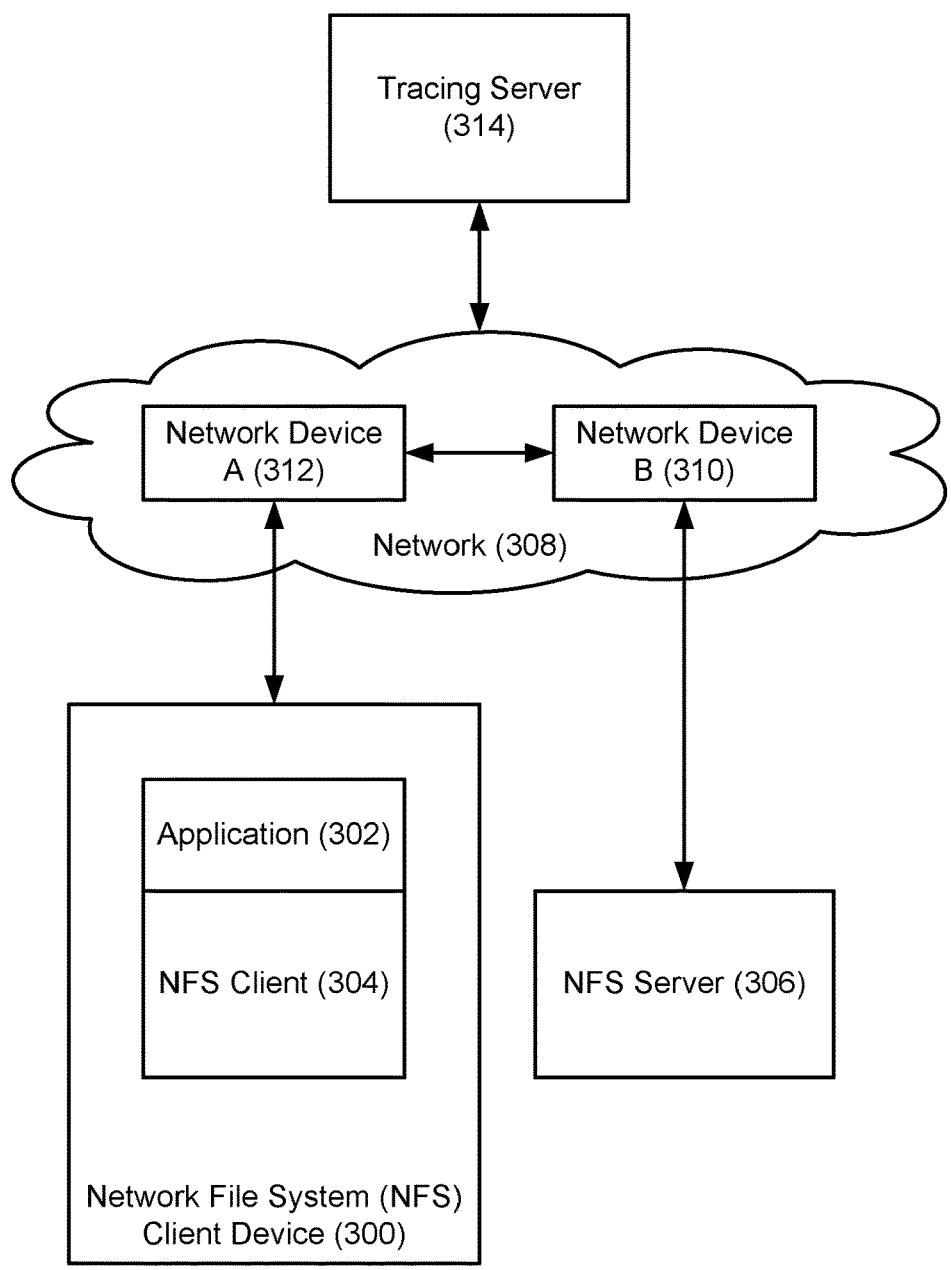
FIGS. 3A, 3B, and 3C show an example in accordance with one or more embodiments of the invention.
Figure 3B:
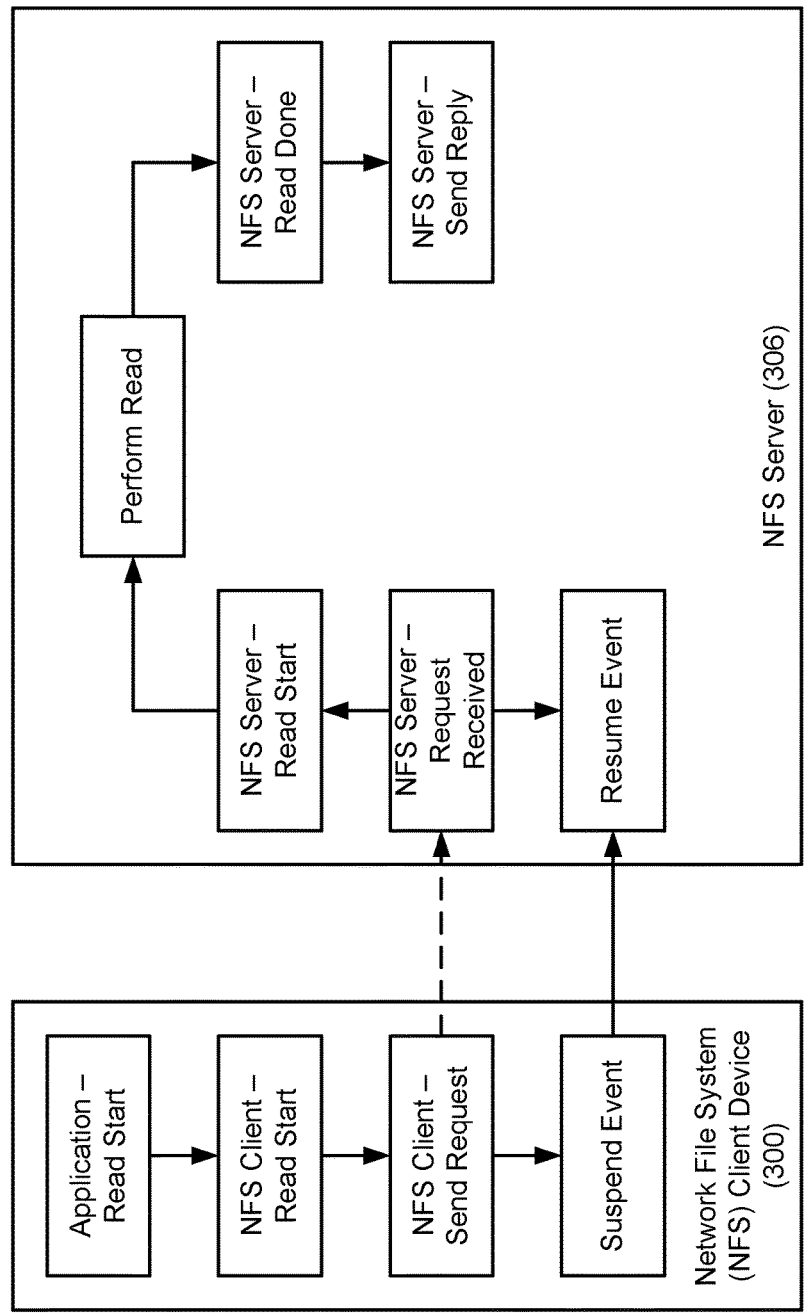
Figure 3C:
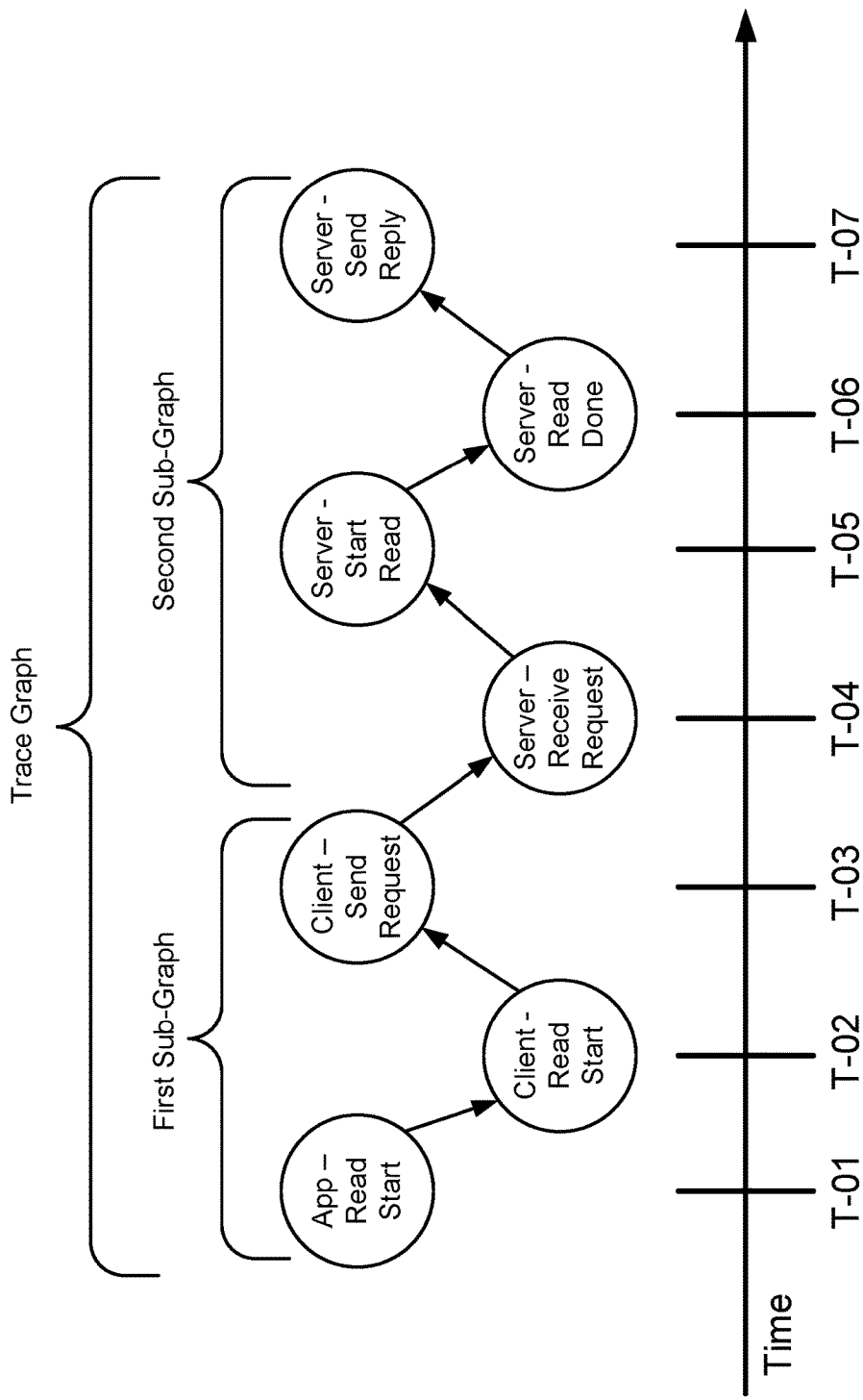

FIGS. 3A, 3B, and 3C show an example in accordance with one or more embodiments of the invention. The following example is for explanatory purposes only and not intended to limit the scope of the invention.

Referring to FIG. 3A, consider a scenario in which NFS operations are being traced (i.e., a trace has been initiated). Such a scenario may include a NFS client device (300), which may include an application (302) and a NFS client (304). The NFS client device may be operatively connected to a NFS server (306) via a network (308) that includes some number of network devices (310, 312). In this scenario, the NFS client device (300) is the first node, and the NFS server (314).

Turning to FIG. 3B, the application (302) is instrumented to initiate a trace when the application seeks to perform a read of data from storage. Therefore, a first event, app-read start, is generated with a trace identifier TID-01, an event identifier EID-02, an ancestor event ID of EID-01 (which corresponds to an event created when the trace was initiated), and a timestamp T-01. An agent executing on the NFS client device creates a first event report for the app-read start event and transmits the first event report to the tracing server.

The storage device storing the data the application seeks to read is operatively connected to the NFS server. Accordingly, the application engages the NFS client (304) to start the read, and a second event, NFS client-read start, is generated with a trace identifier TID-01, an event identifier EID-03, an ancestor event ID of EID-02 (which corresponds to the app-read start event), and a timestamp T-02. The agent executing on the NFS client device then creates a second event report for the NFS client-start read event and transmits the second event report to the tracing server.

The NFS client (304) then forms the read request to be sent to the NFS server. When the read request is formed and passed to the network stack, a third event, NFS client-send request, is generated with a trace identifier TID-01, an event identifier EID-04, an ancestor event ID of EID-03 (which corresponds to the NFS client-read start event), and a timestamp T-03. Because the NFS client-send request event is sending a message from the first node (i.e., the NFS client device) to a second node (i.e., the NFS server), the agent on the first node generates a suspend event with trace identifier TID-01, an event identifier EID-05, an ancestor event ID of EID-04 (which corresponds to the NFS client-send request event), and a message identifier H(message). The message identifier is obtained by the agent by using a hash function on the content of the message to be sent to the NFS server to obtain the hash value H(message) as the message identifier. The agent executing on the NFS client device then creates a third event report for the NFS client-send request event, creates a suspend event report for the suspend event, and then transmits the third event report and the suspend event report to the tracing server.

The tracing server then assembles a first sub-graph using the app-read start event report, the NFS client-read start event report, and the NFS client-send request event report. The first sub-graph is assembled, at least in part, using the trace identifier (TID-01 for all events related to NFS operations traced on the NFS client device) the ancestor event information and time-stamp information included in the event reports for each event. The first sub-graph is shown as a portion of the trace graph shown in FIG. 3C.

Next, the message is transmitted to the NFS server via one or more network devices of the network (308). Once the request arrives at the NFS server, a resume event is generated by an agent executing on the second node to trace NFS operations. The resume event with includes trace identifier TID-02, an event identifier EID-06, an ancestor event ID of 0 (which indicates that the resume event has no ancestors on the second node), and a message identifier H(message). The message identifier is obtained by the agent by using the same hash function on the content of the message that was used by the agent on the first node to obtain the hash value H(message) as the message identifier. Additionally, a fourth event, NFS server-request received, is generated with a trace identifier TID-02, an event identifier EID-07, an ancestor event ID of EID-06 (which corresponds to the resume event), and a timestamp T-04. The agent executing on the NFS server then creates a fourth event report for the NFS server-request received event, creates a resume event report for the resume event, and then transmits the fourth event report and the resume event report to the tracing server.

After receiving the request, the NFS server begins the process of reading the data, and therefore a fifth event, NFS server-read start, is generated with a trace identifier TID-02, an event identifier EID-08, an ancestor event ID of EID-07 (which corresponds to the NFS server-request received event), and a timestamp T-05. The agent executing on the NFS server then creates a fifth event report for the NFS server-read start event and transmits the fifth event report to the tracing server.

Next, the read is performed by accessing storage operatively connected to the NFS server. Once the read is complete, a sixth event, NFS server-read done, is generated with a trace identifier TID-02, an event identifier EID-09, an ancestor event ID of EID-08 (which corresponds to the NFS server-start read event), and a timestamp T-06. The agent executing on the NFS server then creates a sixth event report for the NFS server-read done event and transmits the sixth event report to the tracing server.

Next, the NFS server prepares a reply to send back to the NFS client, and a sixth event, NFS server-send reply, is generated with a trace identifier TID-02, an event identifier EID-10, an ancestor event ID of EID-09 (which corresponds to the NFS server-read done event), and a timestamp T-07. The agent executing on the NFS server then creates a sixth event report for the NFS server-read done event and transmits the sixth event report to the tracing server.

The tracing server then assembles a second sub-graph using the NFS server-request received event report, the NFS server-read start event report, the NFS server-read done event report, and the NFS server-send reply event report. The second sub-graph is assembled, at least in part, using the trace identifier (TID-02 for all events related to NFS operations traced on the NFS server) the ancestor event information and time-stamp information included in the event reports for each event. The second sub-graph is shown as a portion of the trace graph shown in FIG. 3C.

At this point in the example scenario, the tracing server has the first sub-graph and the second sub-graph. In order to assemble the trace graph shown in FIG. 3C, the tracing server obtains the suspend event report received from the first node and the resume event report received from the second node. The suspend event and the resume event are examined and determined to include the same message identifier, which is the same hash value (i.e., H(message)) generated using the same hash function on the same message contents. Accordingly the suspend and resume events are a matched pair. Next, the tracing server examines the trace identifier of the suspend event, which is TID-01 and determines that the trace identifier of each event in the first sub-graph is also TID-01. Then, the tracing server examines the trace identifier of the resume event, which is TID-02 and determines that the trace identifier of each event in the second sub-graph is also TID-02. The tracing server thus obtains the previously generated first sub-graph and second sub-graph. Because the NFS client-send request is the ancestor of the suspend event, and the resume event is the ancestor of the NFS server-request received event, the tracing server connects these two events of the sub-graphs to form the full trace graph shown in FIG. 3C. The matching message identifiers of the suspend event and the resume event allow the tracing server to establish that a causal relationship exists between the events of the first sub-graph and the second sub-graph, and more specifically, between the NFS client-send request event and the NFS server-request received event.

Once the trace graph shown in FIG. 3C is generated, the tracing server may receive queries via a query API from an interested entity and, based on the trace graph of FIG. 3C, respond to the queries. For example, an interested entity may be a user attempting to determine why NFS reads are taking longer than usual, and therefore queries the tracing server via the query API. The tracing server then examines the trace graph (Note: the time axis of FIG. 3C is not drawn to scale) and, using the timestamps of each event, returns a graph that visually displays the latencies between each event to the user. With this information, the user is able to determine that all times were as expected, with the exception of the time between the NFS server-read start event and the NFS server-read done event. Therefore, the user can concentrate on determining why the actual read is taking longer than usual, rather than wasting time checking the client-side operations, or debugging the network connection(s) between the NFS server and the NFS client. In one or more embodiments of the invention, the query API may additionally or alternatively allow an interested entity to query information between pairs of events, which may be used to obtain a distribution of the time spent between the different events needed to process an operation (e.g., an NFS read). In such an embodiment, the distribution may be further exposed through statistics and/or visualized through an interactive graphical user interface.

While the above example only traces NFS operations, one having ordinary skill in the art and the benefit of this Detailed Description will recognize that the trace could have traced more than one layer of operation. For example, the trace may have been configured to trace NFS operations as well as TCP operations, and therefore events corresponding to TCP layer operations would also cause event reports that are sent to the tracing server and ultimately included in the trace graph. Additionally, one having ordinary skill in the art and the benefit of this Detailed Description will recognize that while the above example describes determining causal relationships of an NFS client sending a request to an NFS server, a similar process may be used to capture the sending of a reply back to the NFS client from the NFS server.

One or more embodiments of the invention allow for determination of causal relationships between events rather than mere correlation. Additionally, embodiments of the invention may improve the performance of one or more nodes (e.g., computing device) by allowing for insight into how events are related and when they occur. Additionally, the causal event relationships between nodes is established in one or more embodiments of the invention without making any changes to the message being passed between nodes, such as inserting meta-data into the nodes, and therefore inter-node performance is not impacted.

Figure 4:
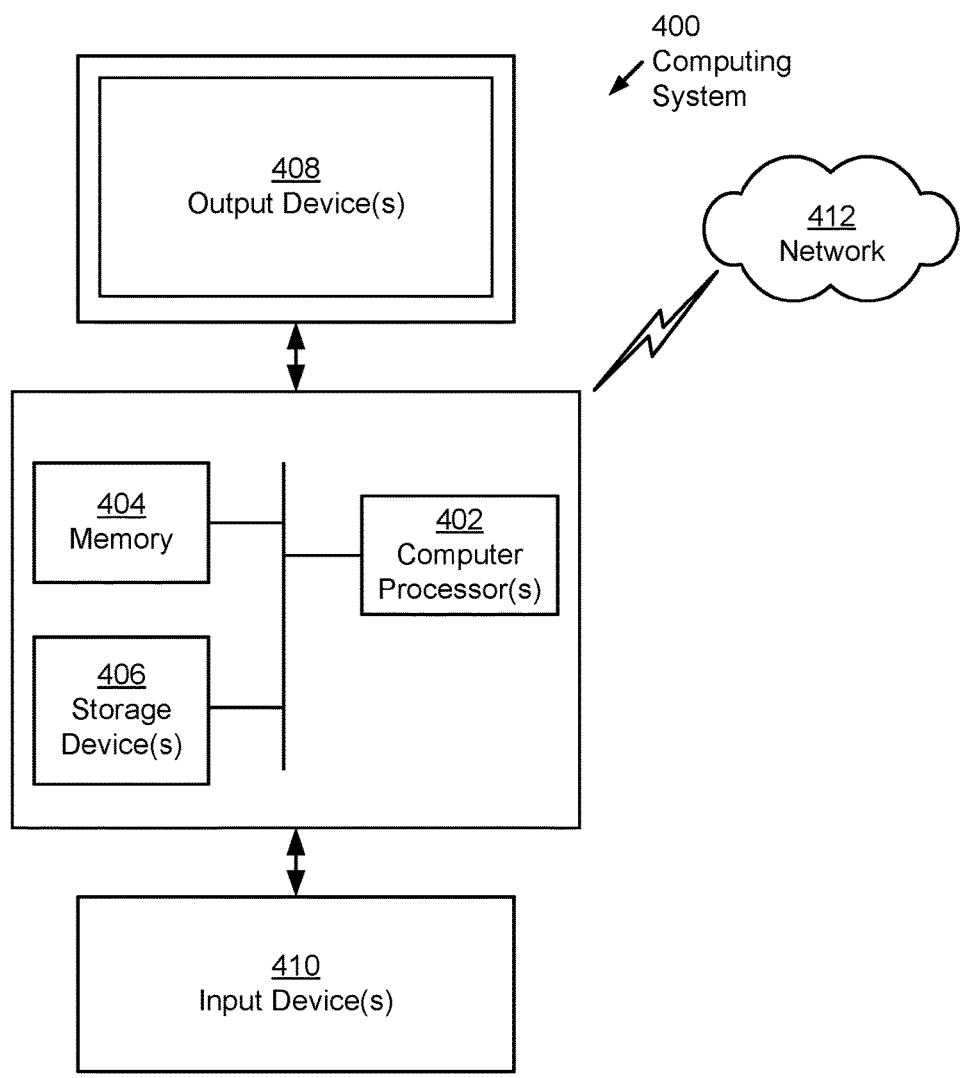
FIG. 4 shows a computing system in accordance with one or more embodiments of the invention.

Embodiments of the invention may be implemented on a computing system. Any combination of mobile, desktop, server, embedded, or other types of hardware may be used. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining causation of events across nodes, the method comprising:
   receiving, at a tracing server from a first node, a first event report of a first trace, wherein the first event report comprises a first trace identifier corresponding to the first trace;
   receiving, at the tracing server, from the first node and for a suspend event of the first node, a suspend event report comprising a message identifier of a message, the first trace identifier, and an ancestor event identifier corresponding to an event preceding the suspend event;
   assembling a first sub-graph using the first event report and the suspend event report;
   receiving, at the tracing server from a second node, a resume event report comprising the message identifier and a second trace identifier of a second trace;
   receiving, at the tracing server from the second node, a second event report of the second trace, wherein the second event report comprises the second trace identifier;
   assembling a second sub-graph using the second event report and the resume event report; and
   assembling, based on determining that the message identifier of the suspend event report and the message identifier of the resume event report are the same, a tracing graph comprising the first sub-graph and the second sub-graph.

2. The method of claim 1, wherein the resume event report further comprises an initial event identifier of the second trace.

3. The method of claim 1, wherein the first event report is generated on the first node and further comprises a first event identifier, and wherein the second event report is generated on the second node and further comprises a second event identifier.

4. The method of claim 1, further comprising:
   receiving, at the tracing server via a query application programming interface (API), a query from a trace consumer;
   determining a response to the query based on the tracing graph; and
   returning the response to the trace consumer.

5. The method of claim 1, wherein the tracing graph represents a series of causally related events.

6. A non-transitory computer readable medium comprising instructions that, when executed by a computer processor, perform a method for determining causation of events across nodes, the method comprising:
   receiving, at a tracing server from a first node, a first event report of a first trace, wherein the first event report comprises a first trace identifier;
   receiving, at the tracing server, from the first node and for a suspend event of the first node, a suspend event report comprising a message identifier of a message, the first trace identifier, and an ancestor event identifier corresponding to an event preceding the suspend event;
   assembling a first sub-graph using the first event report and the suspend event report;
   receiving, at the tracing server from a second node, a resume event report comprising the message identifier and a second trace identifier of a second trace;
   receiving, at the tracing server from the second node, a second event report of the second trace, wherein the second event report comprises the second trace identifier;
   assembling a second sub-graph using the second event report and the resume event report; and
   assembling, based on determining that the message identifier of the suspend event report and the message identifier of the resume event report are the same, a tracing graph comprising the first sub-graph and the second sub-graph.

7. The non-transitory computer readable medium of claim 6, wherein the resume event report further comprises an initial event identifier of the second trace.

8. The non-transitory computer readable medium of claim 6, wherein the first event report is generated on the first node and further comprises a first event identifier, and wherein the second event report is generated on the second node and further comprises a second event identifier.

9. The non-transitory computer readable medium of claim 6, wherein the method performed via execution of the instructions further comprises:
   receiving, at the tracing server via a query application programming interface (API), a query from a trace consumer;
   determining a response to the query based on the tracing graph; and returning the response to the trace consumer.

10. The non-transitory computer readable medium of claim 6, wherein the tracing graph represents a series of causally related events.

11. A system for determining causation of events across nodes, the system comprising:
a first node configured to:
  initiate a first trace;
  generate a first event report corresponding to a first event of the first trace, wherein the first event report comprises a first trace identifier corresponding to the first trace;
  transmit the first event report to a tracing server;
  perform a determination that, as a second event of the first trace, a message is to be sent to a second node;
  generate, based on the determination, a second event report and, for a suspend event, a suspend event report comprising the first trace identifier, a message identifier of the message, and an ancestor event identifier corresponding to an event preceding the suspend event;
  transmit the second event report and the suspend event report to the tracing server; and
  transmit the message to the second node;
the second node operatively connected to the first node and configured to:
  receive the message;
  initiate a second trace;
  generate, based on receiving the message, a resume event report comprising a second trace identifier and the message identifier;
  transmit the resume event report to the tracing server;
  generate a third event report corresponding to a third event of the second trace, wherein the third event report comprises the second trace identifier; and
  transmit the third event report to the tracing server; and
the tracing server operatively connected to both the first node and the second node and configured to:
  assemble, using the first event report, the second event report, and the suspend event report, a first sub-graph;
  assemble, using the third event report and the resume event report, a second sub-graph; and
  assemble, based on determining that the message identifier of the suspend event report and the message identifier of the resume event report are the same, a tracing graph comprising the first sub-graph and the second sub-graph.

12. The system of claim 11, wherein the first node and the second node are separate computing devices.

13. The system of claim 11, wherein the first node and the second node execute on the same computing device.

14. The system of claim 11, wherein the tracing server is further configured to:
  receive, via a query application programming interface (API), a query from a trace consumer;
  determine a response to the query based on the tracing graph; and
  return the response to the trace consumer.

15. The system of claim 11, wherein the tracing graph represents a series of causally related events.

16. The method of claim 1, wherein, before the suspend event report is received at the tracing server, the message identifier is determined on the first node based on a characteristic of the message, and wherein, before the resume event report is received at the tracing server, the message identifier is determined on the second node based on the characteristic of the message.

17. The non-transitory computer readable medium of claim 6, wherein, before the suspend event report is received at the tracing server, the message identifier is determined on the first node based on a characteristic of the message, and wherein, before the resume event report is received at the tracing server, the message identifier is determined on the second node based on the characteristic of the message.

18. The system of claim 11, wherein, before the suspend event report is received at the tracing server, the message identifier is determined on the first node based on a characteristic of the message, and wherein, before the resume event report is received at the tracing server, the message identifier is determined on the second node based on the characteristic of the message.

* * * * *